United States Patent [19]

Winkler et al.

[11] Patent Number: 4,966,505
[45] Date of Patent: Oct. 30, 1990

[54] MACHINE TOOL

[75] Inventors: Hans-Henning Winkler, Tuttlingen; Eugen Rütschle, Mühlheim; Rudolf Haninger, Seitingen, all of Fed. Rep. of Germany

[73] Assignee: Chiron-Werke GmbH & Co. KG, Fed. Rep. of Germany

[21] Appl. No.: 237,725

[22] Filed: Aug. 25, 1988

Related U.S. Application Data

[63] Continuation-in-part of Ser. No. 906,323, Sep. 11, 1986, Pat. No. 4,768,902.

[30] Foreign Application Priority Data

Sep. 17, 1985 [DE] Fed. Rep. of Germany ....... 3533089
Feb. 25, 1988 [DE] Fed. Rep. of Germany ....... 3805844

[51] Int. Cl.$^5$ ............................................. B23Q 11/08
[52] U.S. Cl. ............................. 409/134; 29/DIG. 56; 51/274; 74/608; 408/241 G
[58] Field of Search ............... 409/134, 137, 174, 224, 409/225; 408/241 G; 51/235, 240 J, 240 A, 268, 272, 274; 29/DIG. 56; 83/860; 74/608, 609, 614

[56] References Cited

U.S. PATENT DOCUMENTS

| 3,366,012 | 1/1968 | Richter | 409/134 |
|---|---|---|---|
| 3,703,124 | 11/1972 | Smith et al. | 409/134 |
| 3,824,890 | 7/1974 | Zettler, et al. | 409/134 |
| 4,373,406 | 2/1983 | Piotrowski | 409/134 |
| 4,677,718 | 7/1987 | Babel | 29/33 P |
| 4,768,902 | 9/1988 | Rütschle et al. | 409/134 |

Primary Examiner—Z. R. Bilinsky
Attorney, Agent, or Firm—Walter A. Hackler

[57] ABSTRACT

A machine tool comprises a spindle stock and a worktable having an upper surface thereon for mounting and machining workpieces. The worktable and the spindle stock are alternatively displaceable relative to each other in a plane parallel to the upper surface from a first position at which a first portion of the upper surface is disposed proximate the spindle stock and serves as a processing area and a second portion of said upper surface is disposed distal to said spindle stock and serves as a mounting area, to a second position at which the upper surface second portion is disposed proximate the spindle stock and serves as a processing area and the upper surface first portion is disposed distal to the spindle stock and serves as a mounting area. A splash guard wall is provided for separating the processing in the mounting areas. The splash guard wall is attached to the table upper surface by means of a hinge defining a first pivot axis. Thus, the splash guard wall may be folded about the first pivot axis relative to the upper surface in order that a first working space above the processing area remains larger than a second working space above the mounting area when either the first or second portions of the upper surface is proximate to the spindle stock.

11 Claims, 11 Drawing Sheets

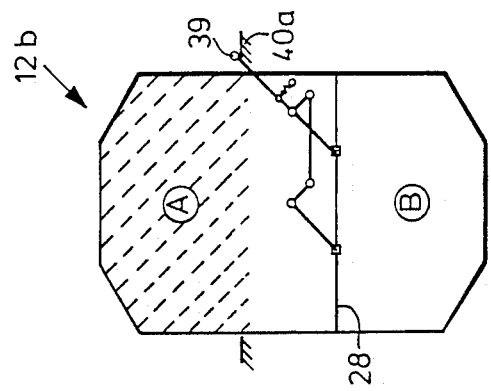
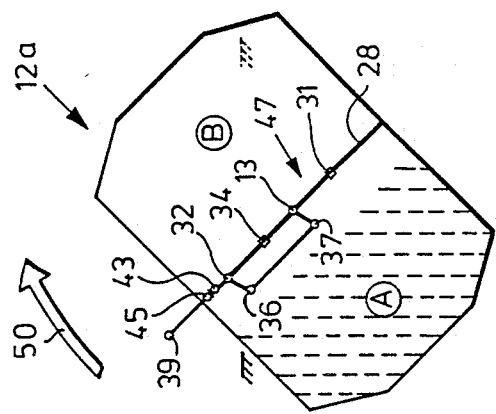
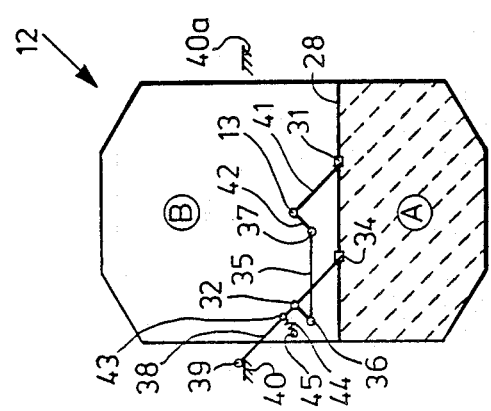
Fig. 3c
Fig. 3b
Fig. 3a

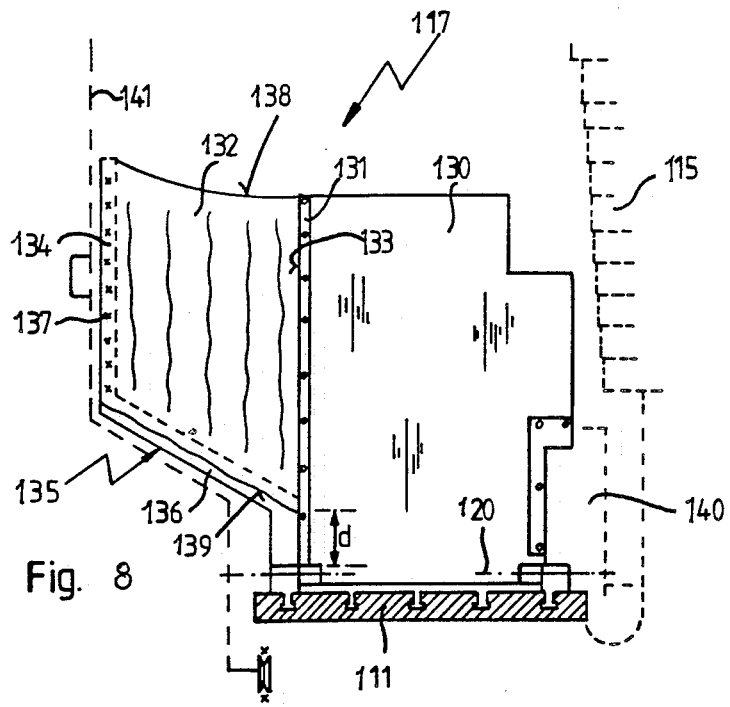
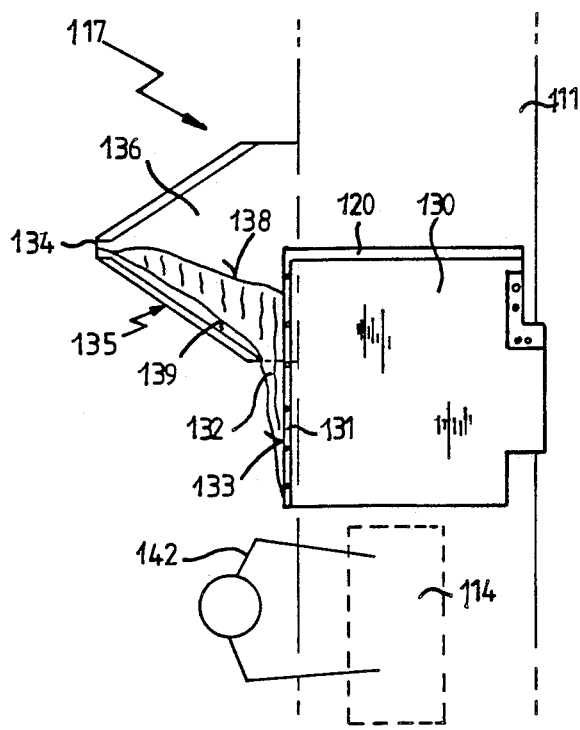

MACHINE TOOL

This application is a Continuation-In-Part application of U.S. patent application Ser. No. 906,323, Filed Sept. 11, 1986, now U.S. Pat. No. 4,768,902.

The present invention relates to a machine tool having a worktable comprising a first area which in a first position in which it serves as the processing side carries workpieces for being processed by means of a tool of the machine tool, and a second area which in a second position in which it serves as the mounting side can receive another workpiece, the two positions of the areas being exchangeable by relative displacement of the table and the spindle stock, and at least one splash guard which can be displaced relative to the worktable and which is arranged between the table areas.

One prior art machine tool is a so-called drilling and milling center with a vertical spindle stock about which a plurality of tools are arranged and where the tools can be loaded into or unloaded from a rotating spindle of the spindle stock one after the other by means of gripper arms to permit a predetermined sequence of operating processes to be carried out on the workpiece or workpieces mounted on the worktable. In this prior art machining center, the spindle stock can be displaced relative to the worktable along several axes. The worktable is designed as a rotary table, the rotary axis of which extends vertically and in parallel to the spindle axis and—viewed from the position of the operator of the machine—in front of the spindle axis.

In the following description, the areas of the worktable that can be displaced in the region of the spindle stock and/or of the user positioned opposite the spindle stock will be identified as "area", the respective position of these areas as "position", the space above the area as "working space", and the purpose the respective areas serve in the different positions as "processing side" or "mounting side", respectively.

The worktable of the known machine tool is subdivided into two areas. Every time the worktable is rotated by 180 degrees, one area serving as processing side is brought into a position near the spindle stock, while the other area serving as the mounting side is brought into a position near the user.

Now, the user can mount the next workpiece on the mounting side while the workpiece mounted on the processing side is being processed.

However, when processing workpieces, certain precautions have to be taken to prevent the operator of the machine tool from being soiled with splashing drilling coolant or even being injured by metal chips flying around. In the case of the prior art machine tool, therefore, the machine tool as such is fully enclosed by a cabin which is closed all around and provided on its top, in the reach of the user, with a hinged door suspended in such a manner that when the door is folded upwards, its lower edge follows a path rising over the outline of a workpiece to be mounted and falling again behind the said outline. In its open-position, the hinged door thus forms a splash wall between the processing side and the mounting side.

However, this known arrangement requires that the hinged door be suspended and guided on its upside so that the arrangement cannot be used in cases where the cover of the machine tool has to be open on its top because, for example, very heavy and/or bulky workpieces have to be placed on the worktable by means of a crane.

Another problem connected with machine tools of this type lies in the fact that although it is desirable that the whole surface of the mounting zone be used for mounting one or more workpieces, problems are encountered when the spindle stock, with the tool mounted therein, moves close to the edge of the processing area, because the casing of the spindle stock projects in this case into the opposite area on the mounting side. In this case, the splash guard would have to be arranged in the region of the mounting area to permit the tool mounted in the spindle axis to move up to the edge of the area on the processing side. When the table is then turned by 180 degrees, the arrangement would have to be exactly the other way, because now the two areas have been changed and the splash guard should be arranged on the surface of that area which previously served as the processing area. The known machine tool does not provide a solution to this problem.

Another prior art protective cover for a machine tool is arranged in a milling machine with a horizontal spindle axis. A worktable of circular shape—viewed from the top—is arranged beside the spindle and adapted to rotate centrically about a vertical axis. The surface of the worktable is subdivided into two semi-circular areas of equal size. Above the worktable, there is arranged a portal extending over the table along one diameter thereof—in a direction vertical to the spindle axis—and carrying three transparent flaps suspended thereon one beside the other on hinges similar to piano hinges. These flaps prevent on the one hand drilling coolant or the like from splashing around and serve, on the other hand, as a safety cover for the user of the machine. When the worktable is turned by 180 degrees in order to exchange the workpiece just processed against another one to be processed, the flaps hanging down from the portal are pushed open by the workpieces or the workpiece holder and return automatically to their position after passage of the workpieces. Thus, this known arrangement also provides the disadvantage that the working area of the worktable has the same size on the processing side and on the mounting side, and the same holds true for the working spaces thereabove.

Further, another prior art device has two worktables which are arranged closely adjacent each other and adapted to rotate about vertical axes extending in parallel to each other. The workholding fixtures provided on the worktable exhibit a rectangular shape, viewed from the top, and project over the edge of the table so that the path of movement of the tool carriers intersect when the worktables are rotated. Between the two worktables, there are provided two screens resting against the two workholding fixtures, respectively. The screens are arranged to pivot about a vertical axis extending symmetrically in front of the two worktables—viewed from the user's position. When one of the worktables is rotated, the screen resting against this table is pivoted by a relatively small angle towards the other worktable, the maximum movement in the direction of the other table being effected by the projecting corner of the rectangular workpiece holder. Upon completion of the rotation, the screen returns to its initial position in which it rests against a longitudinal or narrow side of the workpiece holder and in which it is again out of the path of movement of the workpiece holder associated with the other screen. The screens just described only provide a separation between the two worktables. To screen the processing area from the outside, additional screens extending about the corner of the worktables are required so that the known arrangement offers altogether a very complex design and requires quite a number of movements to permit the workpieces to be mounted and processed by alternation.

Another prior art machine tool is designed as a so-called longitudinal worktable machine tool. Such machine tools or machining centers are provided with a very long worktable having a longitudinal extension of, say, 15 feet or more. In some of these prior art machine tools, the work table is fixed and the spindle stock can be displaced along an axis, parallel to the longitudinal axis of the work table by means of a sliding carriage, carrying the spindle stock. The spindle stock, itself, can further be displaced along further coordinate directions or rotated about vertical or horizontal axes. However, there are also other known machine tools of this kind where the worktable itself can be displaced along its longitudinal axis and the spindle stock is fixed with respect to that axis but can be displaced along further coordinate directions, perpendicular to the longitudinal axis of the worktable and/or can be rotated about such further axes. Further, machine tools are known where both the spindle stock and the worktable are displaceable along directions parallel to the longitudinal axis of the worktable.

The user of such a longitudinal worktable machine tool normally stands next to a longitudinal side of the worktable and the spindle stock is arranged on the opposite longitudinal side. Therefore, the longitudinal worktable is subdivided into a processing side and a mounting side on the right-hand side and on the left-hand side, respectively, of the worktable.

In one prior art machine of this kind, the machine tool is entirely surrounded by a cabin having a rectangular shape, viewed from above, with two long sides parallel to the longitudinal sides of the worktable. The front side of the cabin is provided with sliding doors giving access to the worktable almost over its entire length. The sliding doors are arranged such that e.g. the right half of the longitudinal side may be closed whereas the left-hand side may remain open to allow loading or unloading of workpieces on the mounting side of the worktable. However, in such a case, the user of the machine tool bending over the worktable can be subjected to drilling coolant, splashing around, or can even be injured by metal chips flying around, because there is no separation between the working side and the mounting side of the worktable.

It is, therefore, a first object of the present invention to improve a machine tool of the type described above in such a manner that the worktable is freely accessible from the mounting side, while simultaneously an efficient splash guard is provided between the processing side and the mounting side to protect the user.

It is a further object of the invention to provide a working space above the processing area that is larger than that above the mounting area in order to be able to displace the spindle stock relative to the worktable with the tool travelling over the worktable surface from one end of the surface processing side to the other end near the splash guard.

According to the invention, this object is achieved by a machine tool comprising a spindle stock; a worktable having an upper surface thereon, the worktable and the spindle stock being alternatively displaceable relative to each other in a plane parallel to the upper surface from a first position at which a first portion of the upper surface is disposed proximate the spindle stock and serves as a processing area and a second portion of the upper surface is disposed distal to the spindle stock and serves as a mounting area, to a second position at which the upper surface second portion is disposed proximate the spindle stock and serves as a processing area and the upper surface first portion is disposed distal to the spindle stock and serves as a mounting area; splash guard means for separating the processing and mounting area; and hinge means defining a first pivot axis and mounting said splash guard means to the table upper surface for enabling the splash guard to be folded about the first pivot axis relative to the upper surface in order that a first working space above the processing area remains larger than a second working space above the mounting area when either the first or second portions of the upper surface is proximate the spindle stock.

In a preferred embodiment of the invention, the worktable is disposed in a horizontal relationship and configured for rotation about a vertical axis, the splash guard means is disposed parallel to the vertical axis in a spaced apart relationship therewith and subject to parallel displacement when the rotatable table is rotated from the first to the second position.

Thus, the position of the splash guard, for example a massive splash wall, is such, independent of the respective position of the worktable, that a larger working space is available above the processing side so that the spindle stock can be moved a long way in the direction of the operator. During displacement of the table, the position of the splash guard changes automatically as the table and the spindle stock move relative to each other, so that no additional guiding means acting from above are required. Thus, the mounting side remains freely accessible from above and can be approached without any difficulty, for example by a crane carrying a heavy or bulky workpiece. The splash guard, for example the massive splash wall, which always assumes correct position, ensures automatically and without the need for any additional intervention that the user of the machine is protected reliably against splashing drilling coolant or metal chips flying around.

The invention, therefore, not only opens up extended applications for the machine tool, for example for heavier and bulky workpieces, but improves in addition the safety for the user.

According to a further embodiment of the invention, the splash wall is foldable by means of a dog, the dog being attached to the spindle stock and contacting a folding mechanism of the splash wall where the worktable and the spindle stock are displaced relative to each other in a direction parallel to a longitudinal axis of the worktable.

Thus, for the first time, longitudinal worktable machine tools have the advantage that the user of the machine tool may load or unload workpieces on one side of the longitudinal worktable whereas machining of workpieces may continue on the other side of the longitudinal worktable. All this may happen without the risk that the user comes into contact with splashing coolant or metal chips. Thus, the effective time during which such longitudinal worktable machine tools are in operation, can be drastically increased, because the working on workpieces is possible practically without any interruptions. This is because the spindle stock after having machined all workpieces on the processing side, can then be displaced relative to the worktable in a direction perpendicular to the longitudinal axis for further displacement along the longitudinal axis behind the splash guard wall to come to the mounting side which then will be converted into the processing side. During this relative displacement between the spindle stock and the worktable, the dog will automatically fold the splash guard wall from one end position into the opposite end position such that the former mounting side will now be ready as a processing side and the operator of the machine tool may step aside to come to the former processing side in order to unload the machined workpieces and load fresh unmachined workpieces for subsequent machining.

According to another preferred embodiment of the invention, the folding mechanism is provided with a rocker arm attached to the splash wall, the rocker arm being pivotable about a second pivot axis parallel to the first pivot axis, the rocker arm having a fork-shaped free end grasping said splash wall from both lateral sides.

These measures have the advantage that using a separate rocker arm gives the possibility of using a variety of kinematic mechanisms such as transmissions of force or torque and the like in order to ensure folding of the splash guard wall with minimum amount of force or torque. Grasping the splash guard wall with a fork-shaped element has the advantage that the wall is guided with a certain plate so that the moving elements cannot be jammed. Further, the fork-shaped extension will result in only a minimum mechanical wear of the splash guard wall.

According to a further embodiment of the invention, the second pivot axis is located above the first pivot axis and the dog contacts the rocker arm below the second pivot axis.

These measures have the advantage that an extremely simple kinematic mechanism is used in which the first pivot axis, the second pivot axis and contacting points of the fork-shaped extensions define a triangle which, in turn, ensure reliable end positions during folding of the splash guard wall. The point on which the dog contacts the rocker arm below the second pivot axis ensures that the splash guard wall is folded with extremely simple means and always in a direction opposite to the direction of e.g. the spindle stock, the splash guard wall being e.g. folded from the left to the right when the spindle stock is displaced from the right to the left.

Another preferred embodiment of the invention calls for a spring being connected to the rocker arm in the second pivot axis and being, further, connected to the splash wall distant from the first pivot axis.

These measures have the advantage that the spring is loaded in the folding end positions of the splash guard wall such that the splash guard wall is reliably held in these folding end positions and a folding-back of the splash guard wall that could happen inadvertently, e.g. by draft air or the like, is avoided. According to where the point is located where the spring contacts the splash guard wall, the spring may be designed as a compression spring or a tension spring.

According to a further embodiment of the invention, the dog contacts a nose of the folding mechanism, the nose being pivotable and contacting an actuating area of the folding mechanism under the action of a spring such that when the dog contacts the nose in one direction of relative displacement between the spindle stock and the worktable, the splash wall is folded under the action of a torque transmitted by the nose via the actuating area, whereas when the dog contacts the nose in a second direction opposite to the first direction, the nose is lifted off the actuating area against the action of the spring and is pivoted out of a path of displacement of the dog.

These measures have the advantage that any damage of the folding mechanism is avoided when the splash guard wall, after having been folded automatically, e.g. by means of the spindle stock, is re-folded by hand into its old end position. In that case, the dog during subsequent displacement of e.g. the spindle stock will run against the nose of the folding mechanism which in this position, however, will be pivoted out of the path of displacement of the dog and will then be pivoted back behind the passed dog into its original position such that during a subsequent displacement of the spindle stock the splash guard wall may now be folded regularly.

According to a further preferred embodiment of the invention, the splash guard wall comprises a plate pivotable about the first pivot axis and further comprises a cover which is arranged symmetrically to a central vertical plane of the worktable, the plane comprising the first pivot axis, where the cover covers an area on the mounting side between the central vertical plane and the plate.

These measures have the advantage that the user of the machine tool will be reliably protected from splashing coolant and metal chips also in that area in which the foldable splash guard wall extends over the central vertical plane of the worktable into the respective mounting area. The cover will preferably cooperate with longitudinally displaceable sliding doors as known per se with respect to longitudinal worktable machine tools. Such sliding doors have a vertical limiting edge so that these sliding doors may be displaced until they reach the central vertical plane such that the processing area may be separated from the mounting area in a direction perpendicular to the longitudinal axis of the worktable.

According to a variation of this embodiment, the cover comprises a flexible curtain attached to a longitudinal edge of the plate distant from the spindle stock and extending to an essentially vertical profile arranged in the central vertical plane.

These measures have the advantage that the V-shaped gap remaining between the foldable plate and the central vertical plane is reliably closed during folding of the plate.

According to a further preferred variation of this embodiment, the curtain is attached at the longitudinal edge in a vertical distance from the first pivot axis and the profile is arranged in lateral distance from the worktable and is connected to a V-shaped tapered inclined drain which, in turn, is connected to the worktable.

This has the advantage that the invention may be preferably used in connection with those machine tools that have a cabin which tapers upwardly and in the direction towards the user such that the user may place his feet below the cabin such that an ergonomic working is possible being better than if the user would have to stand adjacent a vertical cabin which would require an inclined working position of the operator. Such tapered arrangements of cabins have the further advantage that guide rails for the sliding doors as well as for a control instrument and the like including the required cable transportation elements may be arranged below the tapered cabin such that these elements do not obstruct the operation of the operator. A further advantage of this variation is that the flexible curtain does not extend down to the first pivot axis such that the elastical bending of the curtain is limited and will not result in a soon wear or material fatique of the curtain.

A further important advantage for the user is that he may freely move in the area of his shoulders, because the essentially vertical profile of the cover is arranged in the same height as the shoulders of an average tall user such that the user may operate in the direct vicinity of the foldable plate without being obstructed from the cover which leaves a free space of operation near the flexible curtain in the height of the shoulders.

According to a further variation of the cover, a wall is provided, being U-shaped in a horizontal plane and tapering above from the worktable in a V-shaped manner, such that the plate, when folded between its end positions, remains within a contour, defined by the wall.

This measure has the advantage that much less moveable elements are required as was the case in the preceding embodiment.

Particularly there is no need for a flexible curtain, however, taking into account larger dimensions of the cover and, hence, less space of activity near the shoulders of the user.

For all of the aforementioned embodiments it may be advantageous to close the processing side of the worktable on the side opposite to the spindle stock from a lateral to the central cover by means of sliding doors.

These measures have the already mentioned advantage that an all-around cover of the processing side is possible.

Finally, another embodiment of the invention is preferred in which the splash guard wall has a first plate being pivotably attached on a first edge to the first pivot axis and, having further a second plate being pivotably attached to the edge by a second edge, parallel to the first edge of the first plate and having further a parallelogram guide for the plates such that in the folded end positions of the splash guard wall the first plate is inclined and the second plate extends vertically.

This measure has the advantage that the working space on the mounting side will only be reduced to a smaller amount, because the pivotable plate will not extend into the mounting side with an inclined upper end but is rather arranged vertically on half of its length or one third of its length. This design essentially corresponds to the usual outline or contour of spindle stocks which normally taper from the tool and have essentially vertical housings above the taper.

Other advantages of the invention will become apparent from the following specification and the drawing. It is understood that the features that have been described before and will be explained hereafter can be used not only in the given combination, but also in any other combinations or separately, without leaving the scope of the invention. In particular, it goes without saying that the invention is by no means restricted to machine tools with horizontal worktables that can be rotated about a vertical axis, but that it can be used with advantage also in connection with worktables which are guided in a different manner, in particular tilted or displaced about any space axis.

Certain embodiments of the invention will be described hereafter in greater detail with reference to the drawing in which:

FIGS. 3a to 3c show diagrammatic representations of three phases of the rotary movement of a worktable effected by a parallelogram guide according to FIG. 2;

Figure 5:
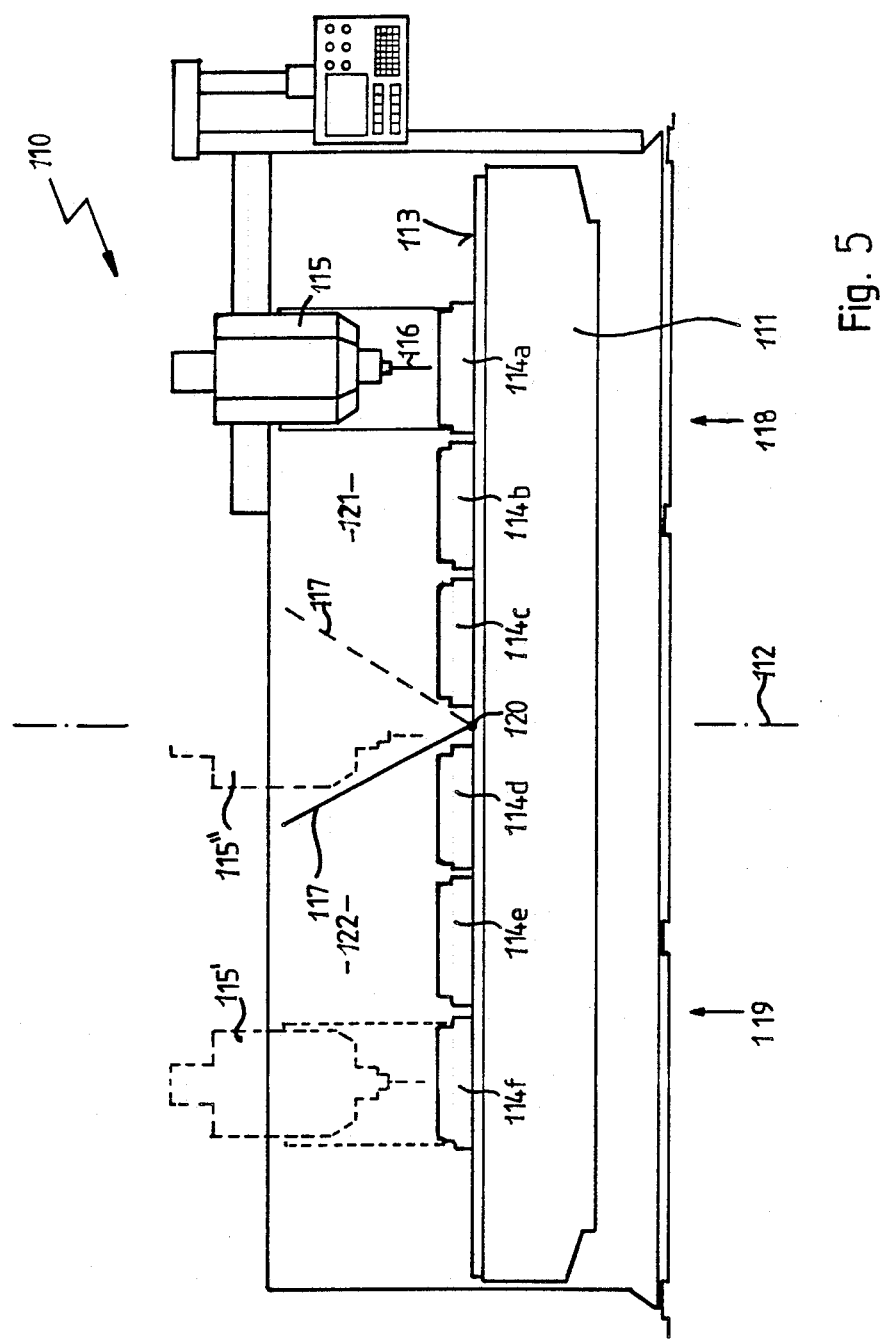
Figure 6:
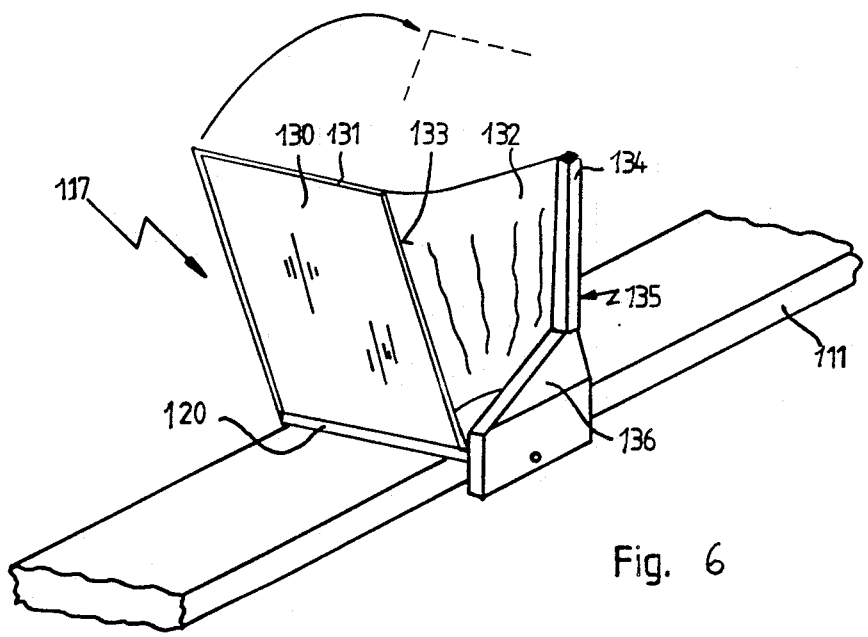
Figure 7:
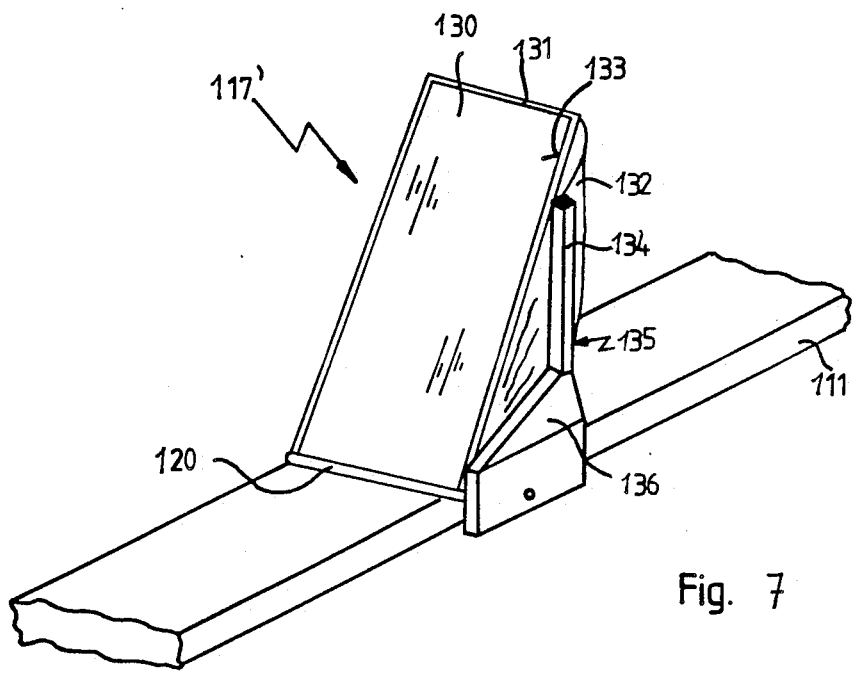
Figure 10:
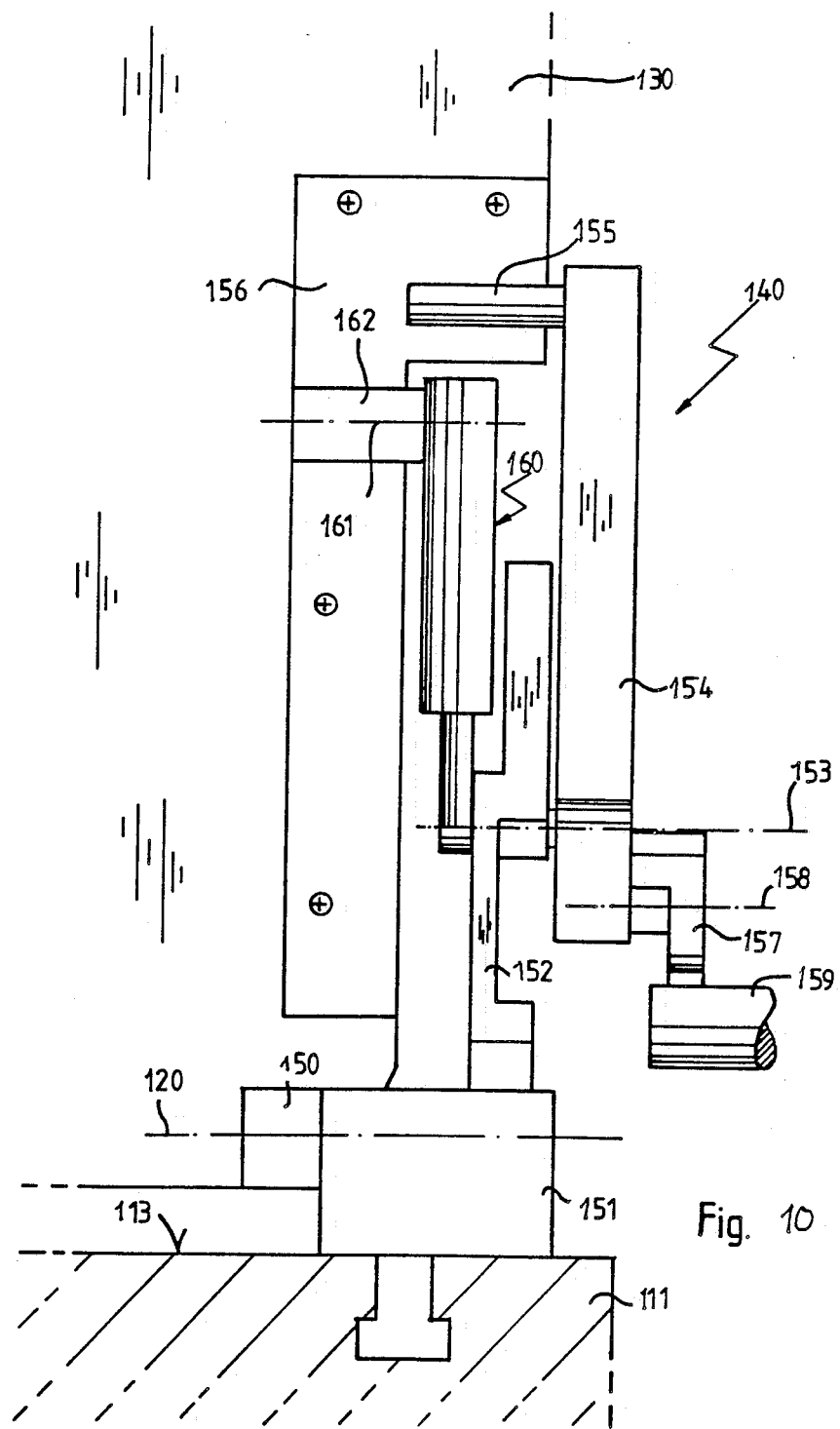
Figure 11:
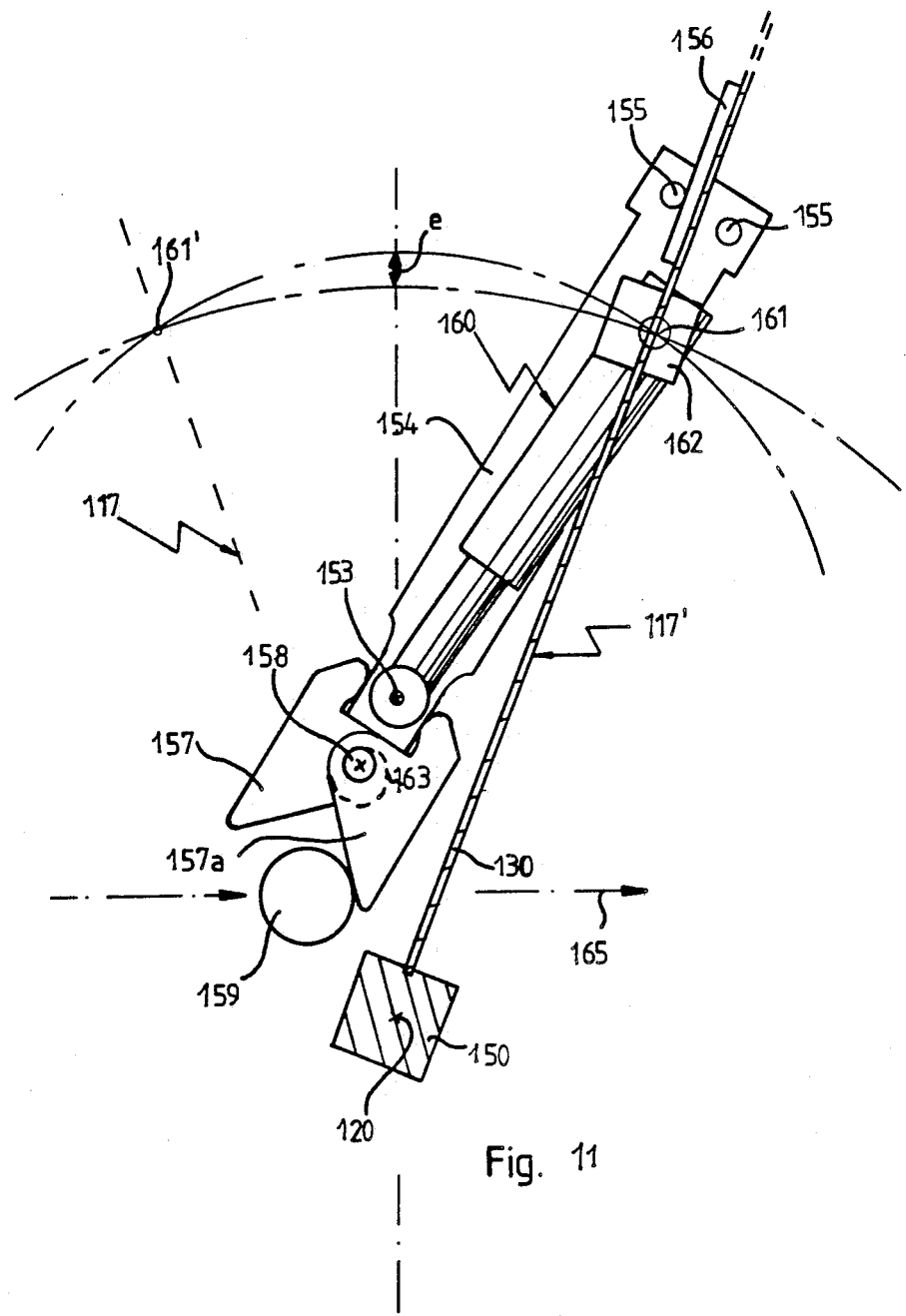
Figure 12:
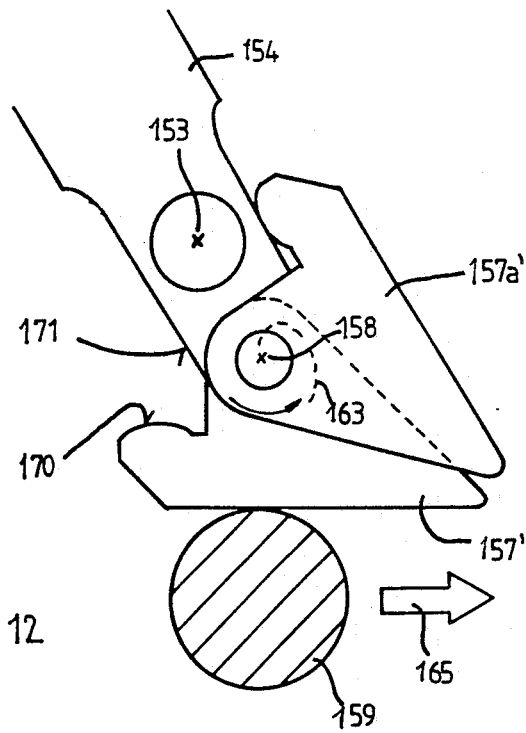
Figure 13:
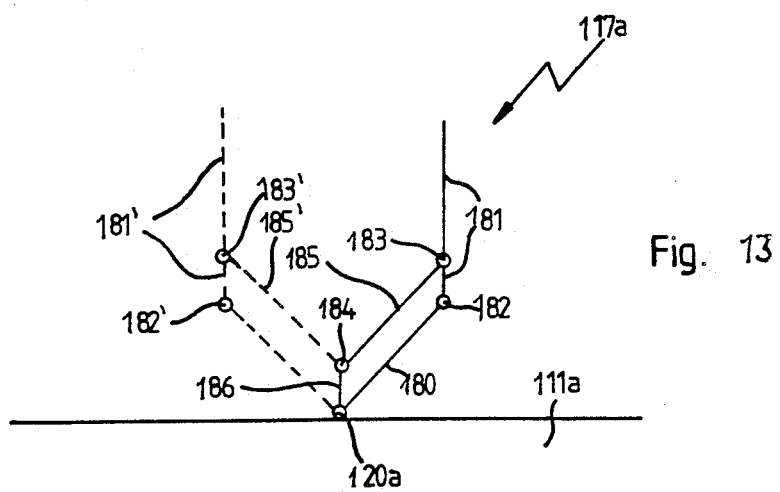
Figure 14:
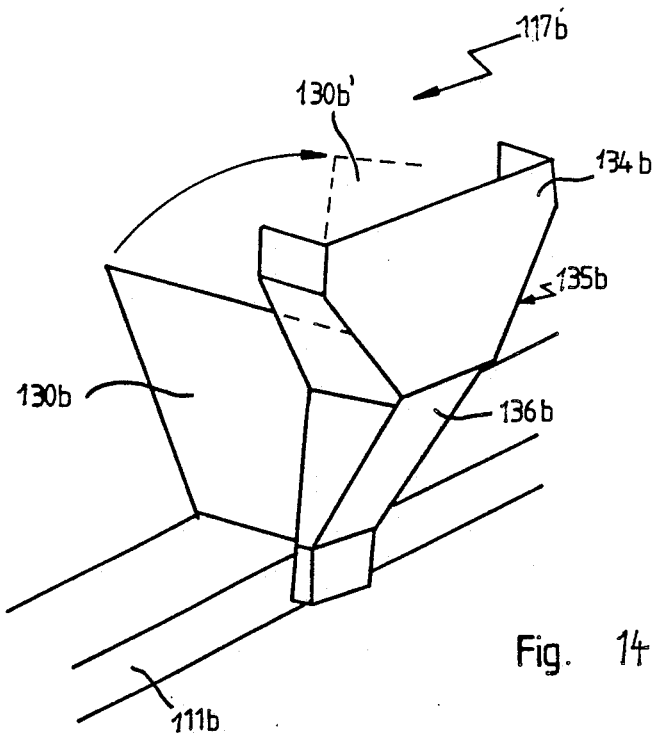

FIG. 5 a side elevational view of a longitudinal worktable machine tool according to the invention, as seen by a user;

FIG. 6 a perspective side elevational view of a first embodiment of a splash guard wall of a machine tool according to the invention, in a first operational end position;

FIG. 7 a view, similar to that of FIG. 6, however for a second operational end position of the splash guard wall;

FIG. 8 a side elevational view of a splash guard wall according to FIGS. 6 and 7, seen in a longitudinal direction of the worktable;

FIG. 9 a top plan view of the arrangement of FIG. 8;

FIG. 10 a folding arrangement for actuating the splash guard wall of any of FIGS. 5 through 9, in an enlarged scale;

FIG. 11 a schematic side elevational view of the arrangement of FIG. 10, seen from the left-hand side;

FIG. 12 a further enlarged detail view of actuating elements of the folding arrangement of FIGS. 10 and 11;

FIG. 13 a highly schematic view from the view point of FIG. 5, for a variation of the splash guard wall, having a parallelogram guide;

FIG. 14 another embodiment for the covers of the splash guard wall from FIGS. 6 through 8.

Figure 1:
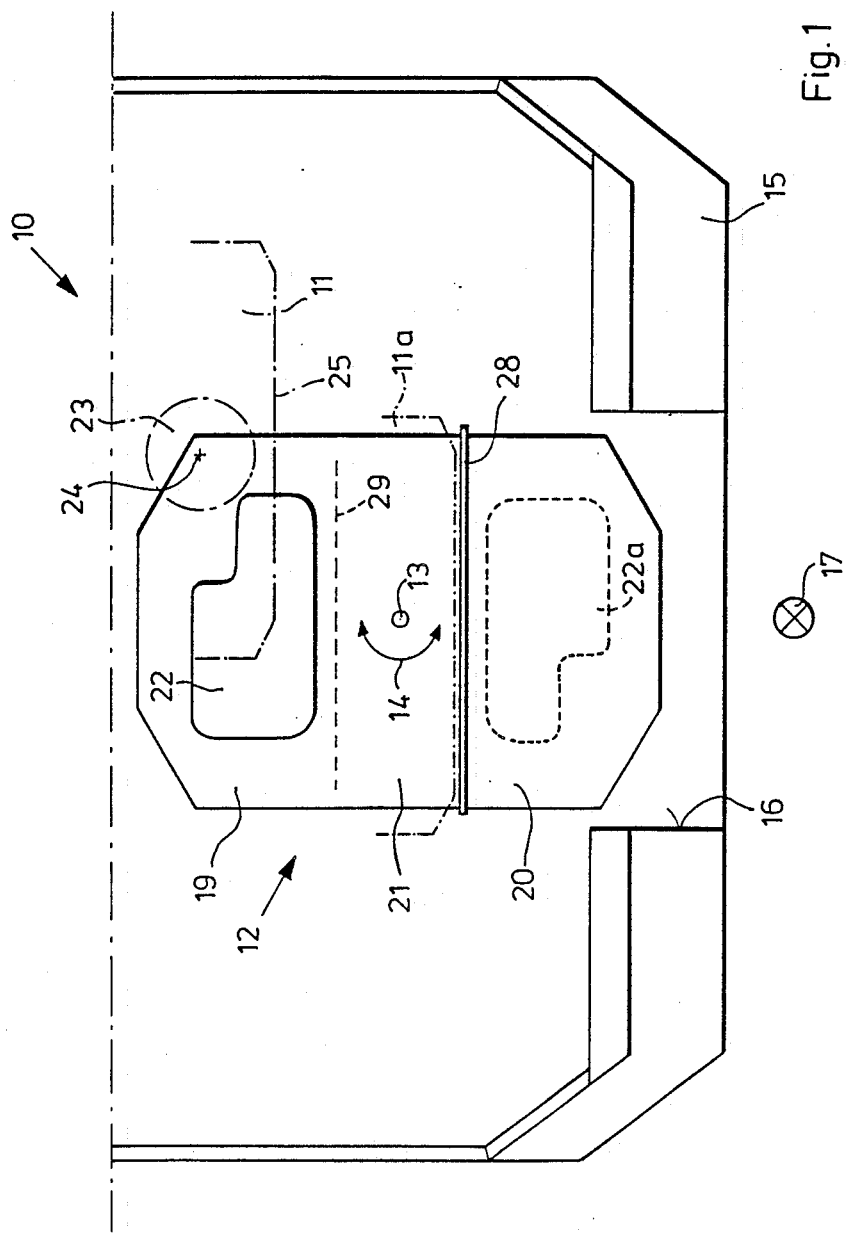
FIG. 1 shows a top view, partially broken away, of one embodiment of a machine tool according to the invention.

In the top view of FIG. 1, part of the front portion of a machine tool is designated by reference numeral 10. A spindle stock 11, of which only the outlines are indicated by dash-dotted lines, can be displaced in the drawing plane, as indicated by a second position 11a. There can be further seen a worktable which is designated as a whole by reference numeral 12 and which can be rotated by 180 degrees about a vertical axis 13 extending perpendicularly to the drawing plane, in the directions indicated by the double arrow 14. The machine tool 10 is enclosed on all sides by a cover whose front portion facing the user is designated by reference numeral 15. The front cover 15 is provided with an opening 16 so that the user can take a position at a point 17 in front of the machine tool 10 or a bulky or heavy tool can be transported into the interior space of the cover from the front and onto the worktable 12 by means of a crane.

The surface of the worktable 12 is subdivided into a processing side 19 in the area of the spindle stock 11 and a mounting side 20 near the opening 16, with a central portion 21 being arranged between these two portions. On the processing side 19, a mounted workpiece 22 can be seen, while another workpiece 22a can be mounted by the user in the mounting side 20 within the outline shown in dashed lines, for the next processing operation. It can be seen that the workpieces 22, 22a do not project beyond the surfaces of the processing side 19 and the mounting side 20, respectively.

The spindle stock 11 projects a certain distance beyond the spindle 23 extending along the spindle axis 24, because the spindle stock 11 is enclosed by a casing 25 housing the drive elements, the gripper arms for changing the tools, a tool magazine, and the like. It is, therefore, understood that during machining of the workpiece 22 a certain clear space must be reserved on the processing side 19 relative to the mounting side 20 so that the spindle stock 11 can be advanced far enough to permit the spindle axis 24 to move over the whole surface of the workpiece 22. This clear space is provided by the central portion 21 which is clear of the workpieces 22, 22a.

In order to protect a user who, standing in front of the machine at the point 17, mounts a workpiece 22a while the workpiece 22 is being machined, from splashing drilling coolant and metal chips flying around, a splash wall 28 is arranged between the mounting side 22 and the central portion 21. This particular location of the splash wall 28 permits the spindle stock 11, with its casing 25, to be moved right up to the splash wall 28, as indicated by reference numeral 11a, and the spindle axis 24 can accordingly move over the whole surface of the processing side 19.

However, it is also obvious that the splash wall 28 cannot be mounted rigidly in the position shown in FIG. 1, because it would in this case, after rotation of the worktable 12, by 180 degrees, assume a position 29 in which it would obstruct the processing of the workpiece 22a which would then be located on the processing side 19.

The splash wall 28 is, therefore, moveable in the manner that will be described hereafter with reference to FIG. 2.

It can be seen that the splash wall 28 forms one longitudinal side of a parallelogram guide. A first lever 30 carrying on its free end the splash wall 28 via a joint 31 is arranged to pivot about the vertical axis 13. A second lever 33 which likewise carries on its free end the splash wall 28 via a joint 34 is mounted to pivot about another axis 32 arranged at a certain spacing from the vertical axis 13. A bar 35 interconnecting the levers 30, 33 by means of joints 36, 37 ensures that the two levers 30, 33 are moved in synchronism. The levers 30, 33, therefore, take the form of two-armed levers, with a first lever arm 41 carrying the splash wall 28 and a second lever arm 42 guiding the bar 35.

It results that the parallelogram guide is formed on the one hand by the surface of the table 12, with the first pair of joints 13, 32, the two levers 30, 33 and, finally, the splash wall 28 with the two joints 31, 34. Strictly speaking, the bar 35 could also be dispensed with; it serves essentially as a means to avoid that the forces necessary for moving the parallelogram guide have to be transmitted by the splash wall 28.

For operation of the parallelogram guide, a third lever 38 forming an actuating lever and carrying on its free end a roller 39 is fixed rigidly on the second lever 33. In the position shown in FIG. 2, the roller 39 rests against a first fixed stop 40. Another fixed stop 40a is arranged symmetrically opposite the first stop 40, relative to the axes 13, 32.

The third lever 38 is provided near its axis of rotation 32 with another joint 43 which is engaged by one end of a tension spring 44. The other end of the tension spring 44 is fastened to a point 45 provided on a projection 46 of the worktable 12. The joint 45 and the axes 32 and 13 are all provided on one straight line 47.

The operation of the parallelogram guide shown in FIG. 2 will now be described with reference to the different phases of movement shown in FIGS. 3a to 3c:

For greater clarity, one of these areas of the worktable 12 is designated by A, the other one by B in the representations shown in FIGS. 3a to 3c. In the initial position shown in FIG. 3a, the zone of the area A which is shaded by dashed lines is positioned on the mounting side, while the area B is positioned on the processing side. The parallelogram guide with its element 30 to 42 occupies its final end position shown already in FIG. 2. Identical parts are designated by identical reference numerals in FIGS. 2 and 3a to 3c.

Now, when the worktable 12 is rotated into the position 12a shown in FIG. 3, in the direction indicated by arrow 50, the roller 39 is disengaged from the first fixed stop 40. The parallelogram guide is moved into a zero position, under the action of the tension spring 44, in which the roller 39, the joints 45, 43, 32, 34, 13 and 31 and the splash wall 28 as well are all arranged along one straight line 47.

When the worktable 12 is rotated further from the position 12a shown in FIG. 3b in the direction indicated by arrow 50 into the end position 12b of FIG. 3c opposite to that shown in FIG. 3a, the roller 39 runs up against the second fixed stop 40a, shortly before this end position 12a is reached, and the parallelogram guide with its elements 30 to 42 is opened again, against the action of the tension spring 44, to occupy a position symmetrical to that shown in FIG. 3a. This brings the splash wall 28 into a position at a certain distance from the center of the mounting side 22, but now the areas A and B have changed their locations.

Figure 4A:
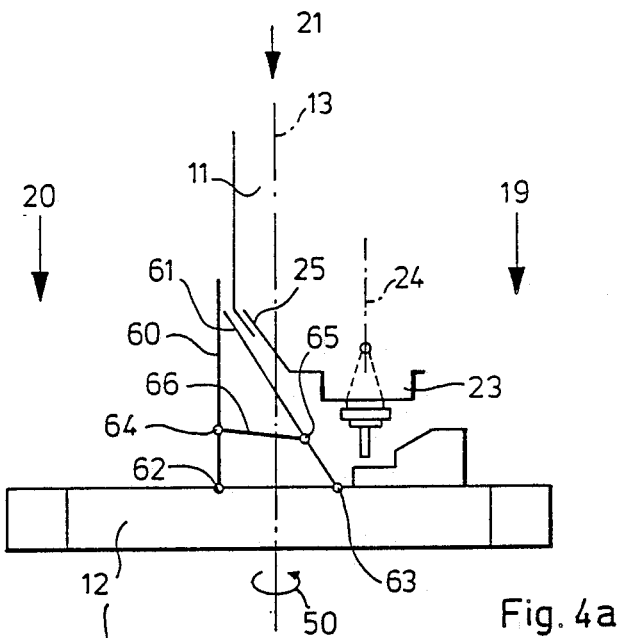
FIGS. 4a and 4b show diagrammatic lateral and top views of a detail of another embodiment of the machine tool according to the invention.
Figure 4B:
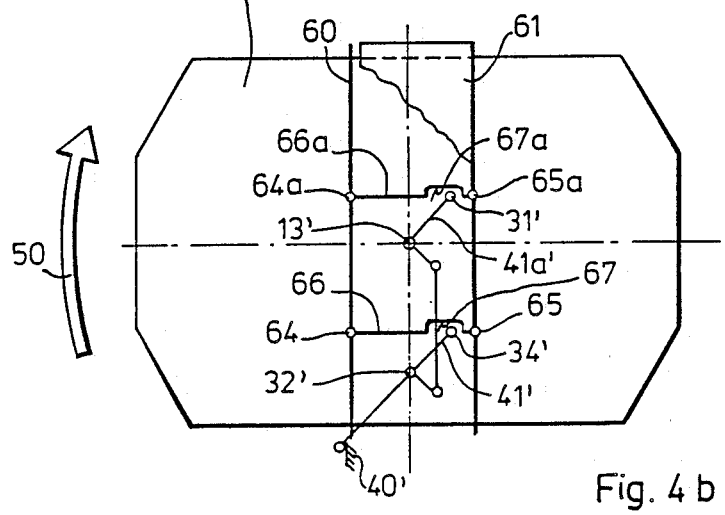

FIGS. 4a and 4b show lateral and top views of another embodiment of the invention.

In the lateral view of FIG. 4a, one can see the worktable 12—which as such is unchanged—comprising the processing side 19 with the spindle stock 11 and the mounting side 20. However, contrary to the embodiments shown in FIGS. 1 to 3, the embodiment shown in FIG. 4 does not comprise one, but rather two splash walls which are designated by reference numerals 60 and 61. The first splash wall 60 is arranged perpendicularly relative to the surface of the worktable 12 in a position corresponding to the position of the splash wall 28 in FIG. 1. The second splash wall 61 is arranged symmetrically to the first splash wall 60, relative to the perpendicular axis 13. It is, however, inclined way of the processing side 19 and may, for example, touch the first vertical splash wall 60 by its upper free edge.

As can be clearly seen in FIG. 4a, the inclined arrangement of the second splash wall 61 does not lead to a substantial loss in working space in the area of the processing side 19, because the casing 25 of the spindle stock 11 is anyway tapered downwardly in the direction of the spindle axis 24 so that the spindle axis 24 can be advanced right to the periphery of the area on the processing side 19. On the other hand, however, the second inclinded splash wall 61 is excellently suited to guide the splashing drilling coolant or metal chips off to the bottom so that they are prevented from getting into the central area 21 between the splash walls 60, 61 which accommodates the mechanism ensuring the oppositely directed movement of the splash walls 60, 61.

In order to effect this oppositely directed movement, the splash walls 60, 61 are pivoted on the surface of the worktable 12 in hinges 62, 63. Joints 64, 65 connected with one bar 66 or several parallel bars 66, 66a, are provided on the splash walls 60, 61 at equal distances from the hinges 62, 63. From this it appears that the bars 66 and the joints 64, 65, the lower sections of the splash wall 60, 61, the hinges 62, 63 and the surface of the worktable 12 in the area of its central portion 21 form together a trapezoidal four-bar linkage. This four-bar linkage can be moved into the position shown in FIG. 4a and to a position mirror-symmetrical thereto, relative to the vertical axis 13, in which position the said first splash wall 60 occupies an inclined, and said second splash wall 61 occupies a vertical position.

Figure 2:
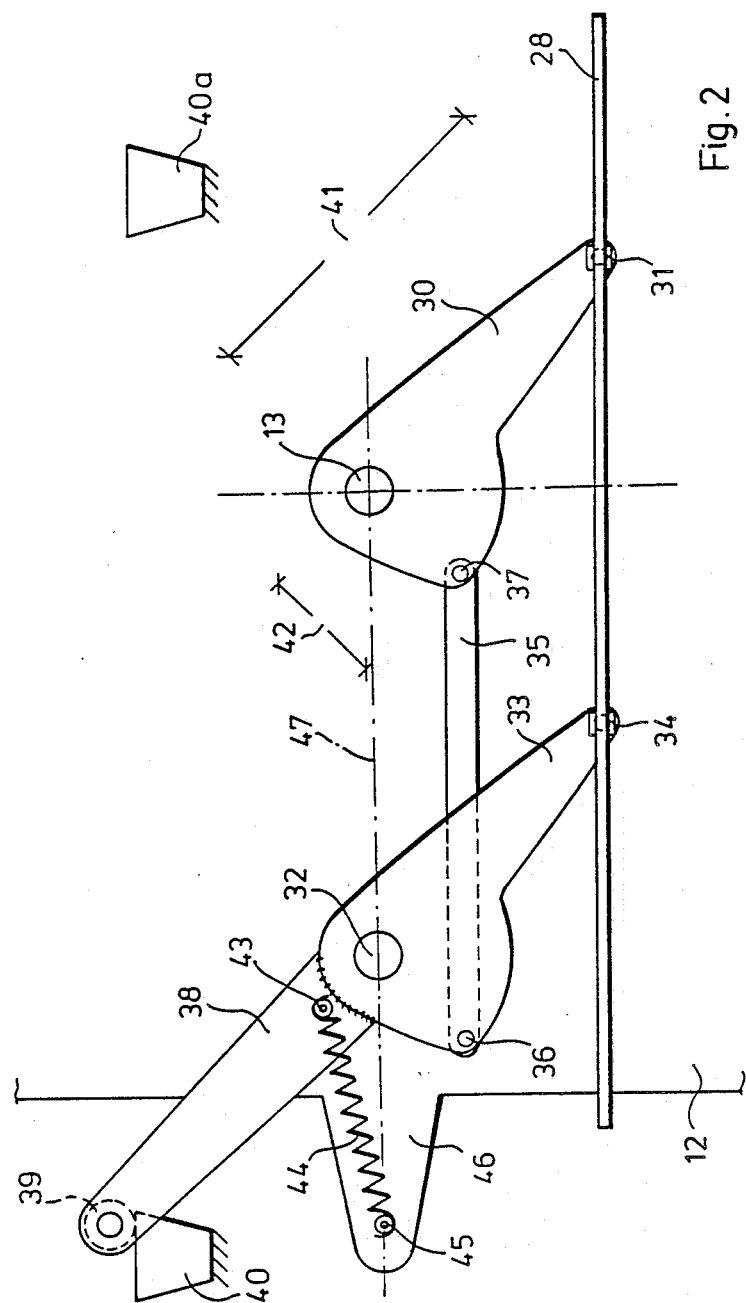
FIG. 2 is a diagrammatic representation of the details of a parallelogram guide for actuating a splash wall of a machine tool according to the invention.

In order to effect this reciprocating movement in synchronism with the reciprocating rotation of the worktable 12 by 180 degrees, there is provided a parallelogram guide shown in FIG. 4b which largely corresponds to that shown in FIGS. 2 and 3. In FIG. 4b, the same reference numerals have been used for equivalent elements of the parallelogram guide as in FIGS. 2 and 3, if necessary supplemented only by an apostrophe.

In FIG. 4b it can be clearly seen that the three ends of the lever arms 41' do not carry the splash wall directly, as in the case of the embodiment illustrated in FIGS. 2 and 3; rather the free ends engage oblong holes 67 and 67a of two mutually spaced bars 66 and 66a which connect the splash walls 60 and 61 in the manner illustrated in FIG. 4a. When the worktable 12 is rotated in one direction, the parallelogram guide is initially moved into the zero position under the action of a tension spring which, for clarity's sake, is not shown in FIG. 4b, in which the splash walls 60, 61 form an equal triangle together with the base defined by the central portion 21, as shown in FIG. 4a. Shortly before the second end position is reached at the end of the rotary angle of a 180 degrees, the parallelogram guide opens again symmetrically in a direction opposite to the original direction, and the splash walls 60, 61 assume a position symmetrically opposite to that shown in FIG. 4a.

In FIG. 5, 110 as a whole indicates a machine tool, namely a so-called longitudinal worktable machining center. Machining centers of this kind are used to subject workpieces to a variety of machining operations, one after the other, and by means of a numerical control. To do so, different tools are loaded into a spindle of a spindle stock one after the other, and the workpiece or workpieces are then machined according to a predetermined program, particularly by drilling or milling.

The machine tool 110, depicted in FIG. 5, has a longitudinal worktable 111, which may extend over a length of, say, 15 to 20 feet. A surface 113 of the worktable 111 extends on both sides of a central vertical plane 112, being vertical to the plane of FIG. 5. Workpieces 114a through 114f may be fixed on the surface 113. A spindle stock 115 is attached to a sliding carriage which is arranged behind the worktable 111, as viewed in FIG. 5. The spindle stock 115 may, thus, be displaced in a direction parallel to a longitudinal axis of worktable 111, and, further, in a second direction perpendicular to the plane of FIG. 5 and, further, in a vertical direction. Besides these displacements in three different coordinate directions, spindle stock 115 can, of course, be equipped with further longitudinal or rotational axes.

Tools 116 of various kind may be loaded or unloaded into or from spindle stock 115, respectively, from a tool magazine, not shown, in order to perform a variety of machining operations on the workpieces 114a through 114f one after the other, particularly by milling or drilling.

Surface 113 of worktable 111 is subdivided into two portions by means of a splash wall 117. At a particular moment, one of these portions, namely the right-hand portion in the representation of FIG. 5, is referred to as a processing side 118, whereas the left-hand portion is referred to as a mounting side 119. Splash wall 117 may be folded about a first pivot axis 120 which extends perpendicularly to the plane of FIG. 5, i.e. parallel to the surface 113 of worktable 111. Splash wall 117 may be folded between two end positions, as indicated by 117 and 117' in FIG. 5. As can clearly be seen from FIG. 5, folding of splash wall 117 results in three-dimensional working spaces 121 and 122, respectively, of different size above processing side 118 and mounting side 119.

Thus, workpieces 114a through 114c may be machined on the processing side 118 by tool 116 of spindle stock 115, without drilling lubricant or metal chips flying over to mounting side 119. During the operation of tool 116 machining workpieces 114a through 114c one after the other, a user of the machine tool 110 may first unload those workpieces from mounting side 119 that have been machined before and may, then, load unmachined workpieces, e.g. those depicted in FIG. 5 by reference numerals 114d through 114f for subsequent machining.

The inclination of splash wall 117 has been set to allow a maximum horizontal displacement of spindle stock 115 on the particular processing side 118. As can clearly be seen from FIG. 5, the housing of spindle stock 115 projects far over the particular tool 116 on both sides. If, therefore, tool 116 has to machine a workpiece 114c, which is mounted in the immediate vicinity of the first pivot axis 120 on surface 113, the housing of spindle stock 115 will project on its left-hand side over central vertical plane 112, as indicated by reference numeral 115" and in dotted lines in FIG. 5. If a rigid vertical splash wall were provided in central vertical plane 112, tool 116 could only be displaced as near to the splash wall as would correspond to the side distance of the tool axis to the outer surface of the housing of spindle stock 115. However, by subdividing working spaces 121 and 122, respectively, asymmetrically as shown in FIG. 5, surface 113 on processing side 118 may be fully used.

As soon as machining of workpieces 114a through 114c on processing side 118 is entirely terminated, spindle stock 115 will be displaced perpendicularly to the plane of FIG. 5 backwards to attain a position behind worktable 111. In this position, spindle stock 115 will then be displaced to the left-hand side on mounting side 119, until it reaches a position as indicated by 115' in FIG. 5. The machine tool is designed such that when the sliding carriage of spindle stock 115 passes by splash wall 117 on its way from position 115 to 115' in FIG. 5, splash wall 117 is automatically folded from its solid line position 117 to dashed-line position 117', as will be explained in further detail below with reference to FIGS. 8 through 12.

As soon as spindle stock 115 has reached position 115', and splash wall 117 has come into position 117', the left-hand section of surface 113 does now serve as processing side in the right-hand section of surface 113 as a mounting side. Therefore, unmachined workpieces 114e through 114f will now be machined by means of tool 116, whereas the user of the machine tool 110 may now unload workpieces 114a through 114e on the previous processing side 118 (now mounting side), having been machined before and will replace them by fresh, unmachined raw workpieces.

By folding splash wall 117, 117', it is ensured in any instance that working area 121, 122, respectively, on the respective processing side is always larger than that on the mounting side. It is a further advantage of this arrangement that the machine tool 110 may be used continuously without standstills, because machining of workpieces on the processing side happens simultaneously to workpiece unloading and reloading on the mounting side, without setting machine tool 110 to a standstill.

FIG. 6 in a perspective view shows another embodiment of a splash wall, according to the invention, in its position 117. Splash wall 117 is provided with a translucent plate 130 of rectangular shape which extends over worktable 111 over its entire width. Translucent plate 130 on its lower edge is connected with worktable 111 by means of a hinge which, thus, defines first pivot axis 120. The hinge is preferably designed such that it can be dismantled from worktable 111 by quick release mechanisms.

A flexible curtain 132 is attached to a vertical longitudinal edge 133 of plate 130 on that side of plate 130 that directs to the user. Another longitudinal edge of flexible curtain 132, being essentially parallel to edge 133 is attached to a vertical U-shaped profile 134, forming a part of a cover 135. Profile 134 is arranged at a lateral distance of worktable 111 and is connected at its lower end with a V-shaped drain 136 which expands from the U-shaped profile 134 in an inclined direction downwardly and serves as a drain for drilling lubricant and milled metal chips which fly against flexible curtain 132 and then roll down on it, roll over drain 136 and finally come into a container of worktable 111, not shown in FIG. 6.

FIG. 7 shows a position 117' of splash wall 117, and one can clearly see that flexible curtain 132 was folded simultaneously with the folding of plate 130 in such a way that the lower edge of curtain 132 was transferred within drain 136 from one folding end position into another.

FIGS. 8 and 9 again show splash wall 117, and one can clearly see that the vertical edge of flexible curtain 132, having been situated on the left-hand side in FIG. 8, is attached to fixing elements 137 on U-shaped profile 34 whereas an upper edge 138 and a lower edge 139 are not attached to solid elements. The lower edge 139 extends in a distance d above first pivot axis 120 so that lower edge 139 during folding of splash wall 117 may glide above the bottom of V-shaped drain 136, as described before.

It becomes particularly apparent from FIG. 9 that a perfect protection of the working area of a user 142 is thus achieved, who stands on the lower half of worktable 111 in FIG. 9, for handling a workpiece 114.

FIG. 8 further indicates that the front side of machine tool 110 may be closed by sliding doors 141 which protrude to the exterior and which are held under the underside of worktable 111 by means of roller/rail-guides. Sliding doors 141 are provided with vertical limiting edges and, thus, allow to close the front side of machine tool 110, as viewed in FIG. 5, e.g. on the right-hand half until central vertical plane 112. However, vertical profile 134 of cover 135 is also situated in central vertical plane 112 so that, as viewed in FIG. 5, e.g. the entire right half of machine tool 110 (i.e. processing side 118) may be closed from the front side by means of sliding doors 141. Additionally, a V-shaped gap between splash wall 117 and central vertical plane 112 is closed by flexible curtain 132. Therefore, user 142 may directly approach splash wall 117 and has sufficient space for operating next to his shoulder due to the inclination of splash wall 117, because flexible curtain 132 will bow with respect to vertically extending profile 134.

Finally, a folding mechanism is indicated with reference numeral 140 in FIG. 8, as will be explained in further detail hereinafter with respect to FIGS. 10 through 12.

FIG. 10 shows further details of folding mechanism 140 in enlarged scale, as viewed in FIG. 8.

Plate 130 is held in a hinge joint 151 by means of a hinge bolt 150, to define first pivot axis 120. Hinge joint 151 is bolted to surface 113 of worktable 111.

A rigid joint arm extends upward from fixed hinge joint 151 and is provided with a joint bore for a second pivot axis 153. A rocker arm 154 is journalled pivotably in second pivot axis 153 by means of an appropriate pin and extends perpendicularly to the plane of FIG. 10, as can clearly be seen from FIG. 11. Rocker arm 154 at its upper free end carries a fork 155, the prongs of which hold plate 113 or a reinforcing sheet metal 156, attached to it, from both sides.

Below second pivot axis 153, rocker arm 154 is provided with noses 157 being pivotable about a third pivot axis 158 against the action of a spring 163. One of the noses 157 is located in a path of displacement of a dog 159 when splash wall 117 is in one of its folded end positions. Dog 159 is rigidly connected to the sliding carriage on which spindle stock 115 may be displaced in a direction parallel to a longitudinal axis of worktable 111.

A spring 160, being a compression spring in the illustrative embodiment, is pivotably attached with its one end to rocker arm 154 in second pivot axis 153. Its upper free end is attached pivotably to a flange 162 in a fourth pivot axis 161, flange 162 being, in turn, rigidly connected to plate 113 or reinforcing sheet metal 156, respectively.

All pivot axes 120, 153, 158, and 161 extend parallel to each other.

The operation of folding mechanism 114, as shown in FIGS. 10 through 11, is as follows:

In the position shown in FIG. 11, one can clearly see that second pivot axis 153 extends vertically above first pivot axis 120. These two pivot axes 120, 153 and contact points of fork 155 to reinforcing sheet metal 156 or plate 130, respectively, define a triangle, thus ensuring two stable folding end positions. This is additionally enhanced by compression spring 160, which acts on plate 130 on a point lying in the fourth pivot axis 161 within the above defined triangle. Thus, spring 160 will be compressed during each folding or re-folding of plate 130 by an amount e shown in FIG. 11. Spring 160 may again decompress when reaching the end positions 117 or 117', respectively. The amount e may be obtained from the difference of circular arcs about axes 120 and 153, respectively, with intersecting points in the fourth pivot axis 161 and 161', respectively, in the other folding end position.

When dog 159, as viewed in FIG. 11, runs from the left-hand side in the direction of arrow 165 to the right-hand side, it will contact the lower free end of nose 157a, having in this direction of contact a rigid rotational connection with rocker arm 154. On its way in the direction of arrow 165, dog 159 will thus exert a torque and pivot rocker arm 154 by exerting force on nose 157a. Rocker arm 154 will, therefore, be rotated about second pivot axis 153 in a counter-clockwise direction. Thus, it will be achieved that splash wall 117 together with plate 130 will always be folded in an opposite direction to the axial displacement of the sliding carriage of spindle stock 15, as has been explained above with respect to FIG. 5.

Now, it could be that—as viewed in FIG. 5—spindle stock is in position 115' and the splash wall is, therefore, in position 117'. If the splash wall is now folded back into position 117 by hand without displacing spindle stock 115', this could present problems with respect to the dog mechanism if spindle stock 115' now returns into position 115. To avoid collision problems in such a case, noses 157, 157a are designed such that each of them may be pivoted about third pivot axis 158 against the action of springs 163.

FIG. 12 shows the situation, explained above, in which dog 159 runs to the right-hand side in the direction of arrow 165, whereas the splash wall is already in its folded left-hand end position 117.

Noses 157 and 157a are each provided with protrusions 170, which, in normal operation, are positioned adjacent an actuating area 171 of rocker arm 154 under the action of spring 163, for example a spiralled spring or a spring clip. As viewed in FIGS. 11 and 12, nose 157 can, therefore, be pivoted in a counter-clockwise direction, whereas nose 157a may be pivoted in a clockwise direction, each against the action of a spring 163. In the opposite direction of rotation, noses 157 and 157a, respectively, have a rigid rotational connection with rocker arm 154.

Considering the situation as shown in FIG. 12 where the splash wall is already in its folded position, dog 159 will contact nose 157 from the left-hand side below the third pivot axis 158 such that nose 157 will be pivoted in a counter-clockwise direction into a position as depicted in FIG. 12 by reference numeral 157'. Protrusion 170 will be lifted off actuating area 171. The geometry of the mechanism is designed such that pivoted nose 157' will be out of the path of displacement of dog 159, which can continue its way in the direction of arrow 165 without actuating rocker arm 154. As soon as dog 159 has cleared pivoted nose 157', the latter will be automatically flipped back into its initial position under the action of spring 163.

During a subsequent way back of dog 159 in a direction opposite to that of arrow 165, splash wall 117 may again be re-folded, because dog 159 will now contact nose 157 from the right-hand side below third pivot axis 158.

FIG. 13 shows a further embodiment of the invention in which plate 130 of FIGS. 6 through 11 is replaced by a first plate 180 and a second plate 181. First plate 180 is journalled at a lower horizontal edge in a first pivot axis 120a on the surface of worktable 111a, similar to plate 130, described above. First plate 180, however, is provided at its upper horizontal edge with a hinge 182 by which it is pivotably connected to second plate 181. A first joint 183 in the second plate 181 and a second joint 184 with bars 185 and 186 define a parallelogram, which is formed by first plate 180, a lower section of second plate 181 between hinge 182 and first joint 183, bars 185 and 186 as well as first pivot axis 120, hinge 182, and joints 183 and 184.

If splash wall 117a, thus formed, is now folded from its solid line position of FIG. 9 into the left-hand dashed-line position, the parallelogram guide, described above, ensures that second plate 181 or 181', respectively, are always oriented in a vertical direction.

In such a way, a still better adaption of the lateral working area to the outer contour of spindle stock 15 is achieved, because spindle stocks of standard design are tapered towards the tool and have a vertically extending outer casing in their upper portion. Therefore, in this way a larger space of activity is obtained for user 142, because splash wall 117a at its upper free end will extend into the working area above the mounting side only as far as it is absolutely mandatory in view of the outer contour of spindle stock 115.

Finally, FIG. 14 shows a further variation of a cover 135b of a splash wall 117b.

For splash wall 117b, there is only provided a foldable plate 130b, but no flexible curtain.

In order to also protect the user of the machine tool in that case in the gap between the central vertical plane 112 and the folded end positions of splash wall 117b, U-shaped profile 134b is designed much broader as in the embodiment of FIGS. 6 through 9. However, it becomes narrower and narrower downwardly until it is connected to drain 136b. The outer shape of cover 135b, therefore, corresponds to the V-shaped area as can be seen in FIG. 5 in a side-elevational view of machine tool 110. Therefore, there is less free space of activity near the shoulder of user 142, however, splash wall 117b does not need a flexible curtain with respective holding elements and respective wear of the elastically deformable elements.

We claim:

1. A machine tool comprising:
   a spindle stock;
   a worktable having an upper surface thereon, said worktable and said spindle stock being alternatively displaceable relative to each other in a plane parallel to said upper surface from a first position at which a first portion of said upper surface is disposed proximate said spindle stock and serves as a processing area and a second portion of said upper surface is disposed distal to said spindle stock and serves as a mounting area, to a second position at which said upper surface second portion is disposed proximate said spindle stock and serves as a processing area and said upper surface first portion is disposed distal to said spindle stock and serves as a mounting area;
   splash guard means for separating said processing and mounting areas;
   hinge means defining a first pivot axis and mounting said splash guard means to said table upper surface for enabling said splash guard (means) to be folded about said first pivot axis relative to said upper surface in order that a first working space above said processing area remains larger than a second working space above said mounting area when either said first or said second portion of said upper surface is proximate said spindle stock, and
   dog means for folding said splash guard means, said dog means being attached to said spindle stock and contacting a folding mechanism of said splash guard means when said worktable and said spindle stock are displaced relative to each other in a direction parallel to a longitudinal axis of said worktable.

2. The machine tool according to claim 1 wherein said splash guard means comprises a splash wall, said folding mechanism being provided with a rocker arm attached to said splash wall, said rocker arm being pivotable about a second pivot axis parallel to said first pivot axis, said rocker arm having a fork-shaped free end grasping said splash wall from both lateral sides.

3. The machine tool according to claim 2 wherein said second pivot axis is located above said first pivot axis and said dog means contacts said rocker arm below said second pivot axis.

4. The machine tool according to claim 2 wherein a spring is provided, said spring being connected to said rocker arm in said second pivot axis and being, further, connected to said splash wall distant from said first pivot axis.

5. The machine tool according to claim 1 wherein said dog means contacts a nose of said folding mechanism, said nose being pivotable and contacting an actuating area of said folding mechanism under the action of a spring such that when said dog means contacts said nose in one direction of relative displacement between said spindle stock and said worktable, said splash wall is folded under the action of a torque transmitted by said nose via said actuating area, whereas when said dog means contacts said nose in a second direction opposite to said first direction, said nose is lifted off said actuating area against the action of said spring and is pivoted out of a path of displacement of said dog means.

6. The machine tool according to claim 1 wherein said splash wall comprises a plate pivotable about said first pivot axis and a cover being arranged symmetrically to a central vertical plane of said worktable, said plane comprising said first pivot axis, said cover covering an area on said mounting side between said central vertical axis and said plate with respect to a side of the machine tool being opposite to said spindle stock.

7. The machine tool according to claim 6 wherein said cover comprises a flexible curtain extending from a longitudinal edge of said plate distant from said spindle stock to a profile being essentially arranged in said central vertical plane.

8. The machine tool according to claim 7 wherein a V-shaped tapered drain is attached to said worktable in an inclined position thereto and at said central vertical plane, said curtain being attached to said longitudinal edge at a vertical distance from said first pivot axis, said profile being located at a lateral distance from said worktable and being connected to said V-shaped tapered inclined drain.

9. The machine tool according to claim 6 wherein said cover comprises a wall, being U-shaped in a horizontal plane and being V-shaped and tapering from said worktable in an upward direction, such that said plate remains within a contour, defined by said wall, when said plate is folded between its end positions.

10. The machine tool according to claim 6 wherein sliding doors are provided for separating said processing area from an area next to said worktable and opposite said spindle stock.

11. The machine tool according to claim 1 wherein said splash wall comprises a first plate being pivotable with a first edge about said first pivot axis and further, comprising a second plate being pivotable about a second edge, parallel to said first edge of said first plate, and comprising a parallelogram guide for said plates such that said first plate is inclinded and said second plate is arranged vertically in any of said folding end positions.

* * * * *